Patented Feb. 22, 1949

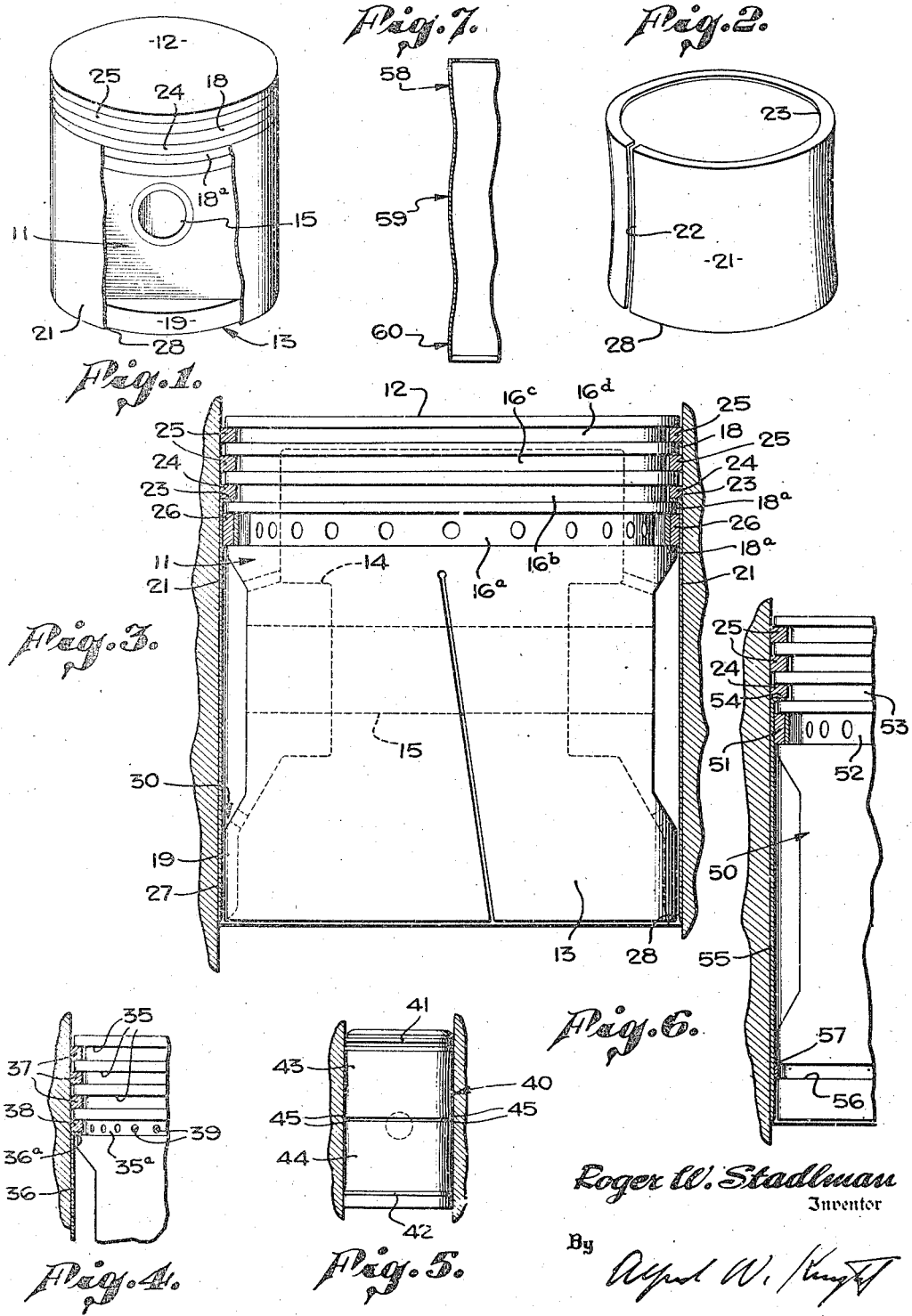

2,462,567

UNITED STATES PATENT OFFICE 2,462,567

PISTON CONSTRUCTION FOR INTERNAL-COMBUSTION ENGINES AND SLEEVELIKE PISTON RING CONSTRUCTION THEREFOR

Roger W. Stadlman, Los Angeles, Calif.

Application April 14, 1947, Serial No. 741,250

16 Claims. (Cl. 309—14)

This invention relates to piston ring structures and pertains more particularly to ring structures for use in internal combustion engines, and has a principal object the provision of a ring structure of light weight adapted to provide a large bearing surface against the cylinder walls in order to eliminate or at least minimize piston slap and cylinder wear.

A further object of the invention is to provide a piston ring adapted to protect the piston so that no part of the main portion of the piston is subject to contact with the cylinder walls, and in which the wear is confined to relatively inexpensive and easily replaceable parts.

Another object of the invention is to improve the over-all efficiency of an engine by providing therefor a piston-ring structure having contact with the cylinder over a large area and yet having such contact entirely resiliently applied, thereby reducing blow-by, oil burning, and oil dilution while keeping bearing pressure at a minimum.

A further object is to provide a ring structure for pistons which does not require initial break-in operation.

The usual practice in internal combustion engines is to mount a piston directly on the oscillating connecting rod by means of a wrist-pin and to provide guidance for the piston by a bearing surface adjacent to the piston head and a second bearing surface at the foot of the piston skirt, with the wrist pin posited approximately mid-way between these surfaces. The upper- or piston-head surface, usually carries several piston rings set in grooves and often backed by expansion rings, and in theory these rings, and not the lands between them, make contact with the cylinder and receive and cause the resultant wear. Actually, unless the skirt bearing surface is so broad and so close fitting as to be a complete guide in and by itself, there is always some tilting of the piston and the upper lands comes in contact with the cylinder as the rings resiliently move from side to side in the grooves. The piston skirt is customarily split to afford some resiliency and some expansion but as it receives very considerable oscillating pressures it still must have substantial inherent rigidity. It is the oscillating side-pressure and gouging of the rigid lands at the piston head and of the semi-rigid skirt that causes irregular wear of cylinder walls, and it is an important object of this invention to transfer an excess of pressure at the end of the piston to the mid-zone adjacent the wrist-pin and thus to distribute the side-thrust evenly and widely.

I accomplish the above and other objects of the invention by providing a piston ring structure in the form of a split sleeve of such thinness as to be resiliently flexible and extending such sleeve over an important proportion of the piston length, as from adjacent the lower edge of the skirt of the piston body to well above the wrist-pin of the piston in the zone usually occupied by the lower piston rings. The sleeve-like piston ring member is supported vertically by an inwardly turned flange engaging one of the piston ring grooves and held therein by a piston ring and is pressed outwardly at points between its end margins in a manner to cause it to flex resiliently against the cylinder wall along its entire length. I may also employ one or more piston rings set in grooves above the ring member, with the lands between these grooves of insufficient diameter to extend outwardly beyond the sleeve-like piston ring member, and thus unable to bear upon the cylinder. It will be understood that when I use such terms as vertical or such relative terms as above or below, I do so for convenience and clarity and with reference to the usual position of a piston in an internal combustion engine in which the piston head is uppermost.

Further objects and advantages of my invention will be apparent from the following description of several embodiments of my invention illustrated in the accompanying drawings, in which:

Fig. 1 is a perspective view of a piston ring of this invention as applied to a piston, with parts cut away to show a portion of the piston body;

Fig. 2 is a perspective view of the sleeve-like piston ring of my invention;

Fig. 3 is a vertical section through a cylinder showing a piston provided with my improved ring structure, as disposed within a cylinder;

Fig. 4 is a fragmentary sectional detail showing the application of my invention to a structure having four conventional piston rings above the skirt-like ring member;

Fig. 5 is a small scale showing of a double installation of ring members of my contemplation, as may be employed upon a long piston;

Fig. 6 is a fragmentary sectional view of one edge of a piston and the cylinder wall against which the piston operates, showing a further modification of my invention; and Fig. 7 is a fragmentary diagrammatic showing of a ring member provided with a modified wall shape, offering a plurality of pressure zones along the length thereof in use.

Having reference to the details of Figs. 1–3 of the drawings, 11 indicates generally a piston body having a head 12 and a skirt 13 which is fitted conventionally with interior bosses 14 supporting a wrist pin 15. The head 12 is provided with a plurality of circumferential grooves 16a, 16b, 16c and 16d, adapted to contain piston rings. The lands 18 between all of said grooves are proportioned diametrically of the piston to afford clearance with the walls of the cylinder to which the piston is fitted, the lands 18a adjacent the lowermost grooves 16a and 16b, being of slightly less diameter than those adjacent the upper grooves, for reasons presently to be stated. The skirt 13 is relieved or recessed adjacent the wrist pin 15 and terminates at its lower end in a circumferential ridge or rim 19, which like the lands 18a affords a clearance with the cylinder wall.

A sleeve-like piston ring 21, of thin sheet metal such as anodized aluminum or any other metal which has little tendency to score or seize when operated in contact with cast iron or steel cylinder walls, surrounds the piston body 11, extending in this embodiment from slightly beyond the ridge 19 to one of the grooves 16, preferably to an intermediate groove 16b, so that of the four such grooves, the lower groove 16a is covered by said sleeve, groove 16b is partly covered, and groove 16a and 16d are left uncovered. The ring 21 is split as shown at 22, to permit assembly with, and subsequent compression upon, the body 11, and has at its upper end an inwardly turned flange 23 which engages the intermediate groove 16b. Flange 23 is of the same thin metal as the cylindrical part of the member 21 and only partly fills the groove 16b, leaving space therein for a piston ring 24. The ring grooves 16c and 16d are provided with rings 25 in the conventional manner. The slightly less diameter of the lower lands 18a, hereinbefore mentioned, permits the ring member 21 to lie between these lands and the walls of the cylinder with some freedom of lateral play.

An expansion ring 26 is preferably contained in the groove 16a and bears outwardly against the inner side of the ring member 21, serving to resiliently expand the sleeve against the cylinder by outward pressure thereon at a position somewhat removed from the flanged upper end thereof.

The sides of the ring 21 are preferably caused to be slightly non-cylindrical, in order that the maximum performance of my invention may be realized, the lower end 27 thereof being preferably flared outwardly to a minor degree so as to have a normal diameter somewhat greater than that of portions of the ring removed from such end and preferably also tapered at the extreme lower edge as at 28. As shown in Fig. 2, this flaring may be effected at both the upper and lower ends of the ring, with the medial portion of the ring necked down to a minor external diameter. In Fig. 3 the flaring or necking is not apparent, inasmuch as the ring 21 is represented as installed upon a piston within the cylinder, and the flaring results principally in increased outward pressure at the upper and lower ends of the ring, with the medial portion forced outward as well by the general contraction of the ring as a result of its being forced into a smaller average diameter condition. It will be understood that the flaring of the end 27 may be only a matter of a few thousandths of an inch, sufficient to insure that the cylinder pressure upon the lower portion of the sleeve 21 is at a maximum at the edge 29. It will be further understood that, while for illustrative purposes the flare is in Fig. 2 shown somewhat exaggerated, it may be a gradual flare making the sleeve in effect an almost imperceptibly tapered cylinder or conic frustum or a hyperboloid of revolution.

In the operation of the piston within a cylinder, the member 21 is supported inwardly at two circumferential areas defined by its contact with the expansion ring 26 and the ridge 19, and is limited in its longitudinal movement relative to the piston body 11 by the flange 23 extending into the groove 16b and restrained against axial movement by the land 18a and the ring 24, which ring 24 occupies the groove 16b and bearing upon the upper side of the flange 23. The ring 24 and flanged end 23 of the ring 21 are mounted in the groove 17b for free independent movement in a radial direction, so that each of these members may independently seat themselves upon the cylinder wall without interference from the other. This ring 24 has the added function of scraping oil from the cylinder wall into the groove 16b where it may freely pass behind and under the flange 23, to thereby form an oil cushion upon which the thin flange 23 may bear, to thus more easily withstand the stresses to which the reciprocation of the piston subjects it; in the same manner the tapered edge 28 scrapes oil into the space 30 and thence into the area of contact between ring member 21 and the ridge 19, there to cushion the lateral stresses arising at that point.

The short land 18a adjacent the flange 23 permits a considerable inward stress to be exerted on member 21 in the vicinity of the flange 23, this stress being supported by the sleeve and by the expansion ring 26 if employed. Similarly, the flared end 27 receives maximum stress upon the edge 28, for which no support is given below the ridge 19. Consequently the two ends of the member 21 serve as levers, acting upon the upper and lower ends as fulcrums, to urge the center portion of the sleeve outwardly into contact with the cylinder wall. As the sleeve is split and therefore circumferentially resilient, and as the expansion ring 26 is a resilient fulcrum if such a ring is employed, this outward urging is gentle and not of a nature to cause binding. It will be understood that the movement to change the ring member from a tapered or concave-sided cylinder to one matching the cylinder of the engine is only of micrometric dimensions.

The use of an expansion ring as at 26 is preferred in such piston constructions and designs where it is necessary to compensate for excessive piston-head weight, to increase the effective area of bearing upon the cylinder wall.

In Fig. 4 I have illustrated a piston construction in which four ring grooves 35 are provided, and in which the sleeve-like ring member 36 of my contemplation is located in the lowermost ring groove 35a. A plurality of piston rings 37 are disposed in the uppermost grooves according to conventional practice, to serve as compression rings, and a piston ring 38 is provided in the groove 35a in position to locate the flange portion 36a of the member 36 against endwise or axial movement. It will be appreciated that in each of the above forms of construction, the ring members 21 and 36 are free to move in a radial direction after the manner of the conventional ring, the radial depth of the grooves 16b and 35a being greater than the radial dimension of the flange portions 23 and 36a of the sleeve-like ring member. Similarly the piston rings 24 and 38 may move radially within the ring groove independent of the movement of the sleeve-like ring member, so that at the position of attachment of the sleeve-like ring member upon the piston body there actually is a compound ring structure provided. In the form of Fig. 4, oil drainage openings 39 may be provided in the ring groove 35a, if desired.

In Fig. 5 I have illustrated an elongated piston body 40 provided at its upper end with a plurality of ring-fitted grooves 41 and a single ring groove 42 at its lower end, a short sleeve-like ring member being fitted within one of the ring grooves 41, as at 43, at the upper end of the piston and a similar sleeve-like piston member 44 being fitted in the lower ring groove 42 in an inverted relation. The ring members 43 and 44 serve to provide a pair of spaced opposing edge portions 45, which may be shaped to correspond to the thin edge 29. The axial length of the members 43 and 44 may be flared or necked after the manner shown in Fig. 2, if desired, so that the bearing pressure of the ring members against the cylinder side walls is accentuated at the respective upper and lower end portions of the individual ring members.

The structure shown in Fig. 6 may comprise a piston 50 provided with an upper structure which may conform to the showing in Fig. 3, for example, in which an expansion member 51 is provided in the ring groove 52 below the groove 53 in which the flanged portion 54 of the sleeve-like ring member 55 is disposed. The lower end of the piston 50 is provided with a shallow groove 56 carrying a thin-walled "marcel" or expansion member 57, bearing outwardly against the lower end portion of the ring member 55, so as to accentuate the outward bias of the lower end of the ring member upon the cylinder wall and increase the stabilizing action thereof upon the piston.

As shown in Fig. 7, the sleeve-like ring member may be given a wave form along its length, to provide additional distribution of bearing pressure along the length of the piston, as at 58, 59 and 60. If desired, the shapes shown in Fig. 7 and in Fig. 2 may be combined so that the bearing portions 58 and 60 normally extend outwardly of the intermediate bearing portion 59, so as to provide increased bearing pressure at the upper and lower ends of the ring member when it is installed within the cylinder.

I have found that for the best performance of my skirt-like ring member that there is a preferred ratio of about 1:500 to about 1:700 between the thickness of the wall portions of the ring member and the square of the piston diameter. For example, I have found that a wall thickness in the neighborhood of .015" is suitable for piston diameter up to about 3 inches, .025" is suitable for piston diameter between 3 and 4 inches, .045" thickness for pistons of 4 to 5 inch diameter, etc., up to a thickness of about 0.125" for pistons of 7½ inch diameter and greater. The amount of necking, i. e., reduction of the free diameter of the ring member in the central zone of its length (as illustrated in Fig. 2), I have found to be preferably on the order of about ⅛ to ½ the thickness of material of which the ring member is formed; the longer the ring member, the greater this necking can be.

Obviously my invention is subject to some modification, hence I do not choose to be limited to the above-described examples, but rather to the scope of the appended claims.

I claim:

1. A piston comprising a body having a head portion with at least three circumferential grooves and a skirt portion; a split sleeve-like piston ring member of thin sheet metal material enveloping said skirt portion and in resilient contact with said skirt portion at a position below the upper end of said piston ring member; an inwardly turned flange on one end of said member partly filling an intermediate one of said grooves; and piston rings in such of said grooves as are left uncovered or partly filled by said sleeve.

2. A piston comprising a body having a head portion with at least three circumferential grooves and a skirt portion; a split sleeve-like piston ring member of thin sheet metal material enveloping said skirt portion and extending to an intermediate one of said grooves; an inwardly turned flange on one end of said member partly filling said intermediate groove; piston rings in such of said grooves as are left uncovered or partly filled by said sleeve; and an expansion ring in another of said grooves bearing against the inner side of said member.

3. A piston comprising a body having a head portion with at least three circumferential grooves and a skirt portion; a split sleeve-like piston ring member of thin sheet metal material enveloping said skirt portion and extending to an intermediate one of said grooves; an inwardly turned flange on one end of said member partly filling said intermediate groove; the side wall portion of said sleeve-like piston-ring member being of curved conformation in the direction of the length of said member whereby the outside diameter of said member varies from a maximum adjacent one end to a minimum at a position intermediate the ends of said member.

4. A piston comprising a body having a head portion with at least three circumferential grooves and a skirt portion; a split sleeve-like piston ring member of thin sheet metal material enveloping said skirt portion and extending to an intermediate one of said grooves; an inwardly turned flange on one end of said member partly filling said intermediate groove; piston rings in such of said grooves as are left uncovered or partly filled by said sleeve; an expansion ring in another of said grooves bearing against the inner side of said member; said member having adjacent its other end an area of normal contact with said skirt and having an outwardly flared end margin beyond said area of contact actuable by outward pressure of said member on said area of contact and by inward pressure of the wall of a cylinder as a lever to urge outwardly the middle portion of said member.

5. A piston for a cylinder of an internal combustion engine comprising a body inclusive of a head having a plurality of circumferential grooves, and a skirt having a relieved center portion and a circumferential ridge disposed oppositely to said head; a sleeve-like piston ring member encompassing a portion of said body and having at its one end an inwardly turned flange and at its other end an outward flare; an expansion ring in one of said grooves bearing against the inner side of said member; said flange engaging another of said grooves disposed toward said head from said first mentioned groove, and said flare extending beyond said ridge; said member being supported internally by said expansion ring and by said ridge.

6. A piston for a cylinder of an internal combustion engine comprising a body inclusive of a head having a plurality of circumferential grooves, and a skirt having a relieved center portion and a circumferential ridge disposed oppositely to said head; a sleeve-like piston ring member encompassing a portion of said body and having at its one end an inwardly turned flange and at its other end an outward flare; an expansion ring in one of said grooves bearing against the inner side of said member; said flange engaging another of said grooves disposed toward said head from said first mentioned groove to limit longitudinal motion of said member relative to said body; a piston ring in said other groove further limiting said motion; additional piston rings in said grooves wherever said member permits contact of said rings with the walls of said cylinder; said member being supported internally by said expansion ring and by said ridge.

7. A piston for a cylinder of an internal combustion engine comprising a body inclusive of a head having at least one circumferential groove, and a skirt; a sleeve-like piston ring member encompassing a portion of said body and having at its one end an inwardly turned flange and being flared outwardly toward its other end, said flange engaging said groove to limit longitudinal movement of said member relative to said body; and means associated with said body supporting said member at two circumferential areas inwardly from and adjacent to the ends of said member, the support at one of said areas being of a resilient nature.

8. A construction as set forth in claim 7, the support at both of said areas being of a resilient nature.

9. A piston for a cylinder of an internal combustion engine comprising a body inclusive of a head having at least one circumferential groove, and a skirt; a sleeve-like piston ring member encompassing a portion of said body and having at its one end an inwardly turned flange and being flared outwardly toward its other end, said flange engaging said groove to limit longitudinal movement of said member relative to said body, the maximum diameter of said body being less than the minimum external operating diameter of said member.

10. A piston for a cylinder of an internal combustion engine comprising a body inclusive of a head having at least one circumferential groove; and a skirt; a sleeve-like piston ring member encompassing a portion of said body and having at its one end an inwardly turned flange and being flared outwardly toward its other end, said flange engaging said groove to limit longitudinal movement of said member relative to said body, the maximum diameter of said body being less than the minimum external operating diameter of said member; and means associated with said body supporting said member at two circumferential areas inwardly from and adjacent to the ends of said member, the support at one of said areas being of a resilient nature.

11. A construction as set forth in claim 10, the support at both of said areas being of a resilient nature.

12. A piston for a cylinder of an internal combustion engine comprising a body inclusive of a head having a plurality of circumferential grooves, and a skirt; a sleeve-like piston ring member encompassing a portion of said body and having at its one end an inwardly turned flange and being flared outwardly toward its other end, said flange engaging one of said grooves to limit longitudinal movement of said member relative to said body, said piston ring and said flange being adapted for radial movement independent from one another; a piston ring in said one groove further limiting said motion; additional piston rings in said grooves wherever said member permits contact of said rings with the walls of said cylinder; and means associated with said body supporting said member at two circumferential areas inwardly from and adjacent to the ends of said member, the support at one of said areas being of a resilient nature.

13. A piston ring member for internal combustion engine pistons, which comprises: an elongated sleeve-like member of general tubular conformation provided at one end with a radially inward directed flange member adapted to enter a conventional piston-ring groove, said member being slitted lengthwise to provide for radial expansion and contraction thereof, and having side walls of curved conformation in the direction of the length of said member whereby the outside diameter of said member varies from a maximum adjacent said one end to a minimum at a position intermediate the ends of said member.

14. A construction as set forth in claim 13, the inner surface of the side walls at the other end of said member being bevelled off in an outward direction to provide a thin edge at the peripheral outline of said other end.

15. A construction as set forth in claim 14, the outer diameter of said member being greater at the respective ends thereof than at the medial portion thereof.

16. A construction as set forth in claim 15, the variation in diameter of said member in a longitudinal direction as the result of said curved sidewall conformation being on the order of one-eighth to one-half the thickness of such side wall.

ROGER W. STADLMAN.

REFERENCES CITED

The following references are of record in the file of this patent:

UNITED STATES PATENTS

| Number | Name | Date |
| --- | --- | --- |
| 1,938,826 | Frank | Dec. 12, 1933 |
| 2,289,251 | Donaldson | July 7, 1942 |